United States Patent [19]

Yanagisawa et al.

[11] Patent Number: 5,329,387
[45] Date of Patent: Jul. 12, 1994

[54] LIQUID CRYSTAL DISPLAY DEVICE WITH DISPLAY AND COMPENSATION CELLS SEPARATED BY DISTANCE LARGER THAN DEPTH OF FOCUS OF OPTICAL ENLARGER

[75] Inventors: Masaki Yanagisawa, Tokyo; Tsuyoshi Suzuki, Hamura; Kazuhiro Sakai, Fussa, all of Japan

[73] Assignee: Casio Computer Co., Ltd., Tokyo, Japan

[21] Appl. No.: 792,798

[22] Filed: Nov. 15, 1991

[30] Foreign Application Priority Data

Nov. 27, 1990 [JP] Japan .............................. 2-124782[U]
Dec. 27, 1990 [JP] Japan .................................. 2-407110

[51] Int. Cl.$^5$ ..................... G02F 1/133; G02F 1/1335
[52] U.S. Cl. ......................................... 359/53; 359/73
[58] Field of Search ................................. 359/53, 73

[56] References Cited

U.S. PATENT DOCUMENTS

| | | | |
|---|---|---|---|
| 5,044,732 | 9/1991 | Kimura et al. | 359/53 |
| 5,126,868 | 6/1992 | Kizaki et al. | 359/73 |
| 5,136,406 | 8/1992 | Kato et al. | 359/53 |

FOREIGN PATENT DOCUMENTS

| | | | |
|---|---|---|---|
| 0320283 | 6/1989 | European Pat. Off. | 359/73 |
| 0079018 | 3/1990 | Japan | 359/73 |

*Primary Examiner*—Anita P. Gross
*Attorney, Agent, or Firm*—Frishauf, Holtz, Goodman & Woodward

[57] ABSTRACT

A liquid crystal device of this invention is constituted by a display cell, a compensation cell, and a pair of polarizing plates. The display cell is designed such that electrodes are respectively formed on the opposing surfaces of a pair of substrates, arranged to oppose each other through a predetermined gap, to be perpendicular to each other, alignment films are respectively formed to cover the electrodes, and a first liquid crystal material is sealed between the substrates to be twisted at a predetermined angle. The compensation cell is arranged to be stacked on the display cell. The compensation cell is designed such that a second liquid crystal material is sealed between a pair of substrates, subjected to alignment processing, to be twist-aligned in a direction opposite to the twist direction of the first liquid crystal material. The pair of polarizing plates are arranged to sandwich the display and compensation cells. A refractive index anisotropy $\Delta n_1$ of the first liquid crystal material is 0.18 or more, and a product $\Delta n_1 \cdot d_1$ of the refractive index anisotropy $\Delta n_1$ of a layer thickness $d_1$ of the first liquid crystal material is 0.7 μm or more. A product $\Delta n_2 \cdot d_2$ of a refractive index anisotropy $\Delta n_2$ and a layer thickness $d_2$ of the second liquid crystal material is smaller than the product $\Delta n_1 \cdot d_1$ of the first liquid crystal material.

3 Claims, 5 Drawing Sheets

LIQUID CRYSTAL DISPLAY DEVICE WITH DISPLAY AND COMPENSATION CELLS SEPARATED BY DISTANCE LARGER THAN DEPTH OF FOCUS OF OPTICAL ENLARGER

BACKGROUND OF THE INVENTION

1. Field of the Invention

The present invention relates to a super twisted nematic (to be referred to as STN hereinafter) liquid crystal display device and a liquid crystal display device for enlarging a displayed image and allowing observation of the image.

2. Description of the Related Art

As a liquid crystal display device for displaying an image by using a liquid crystal cell, a display device using an STN liquid crystal cell is available. In this device, the multiplexing drive performance is improved by setting the twist angle of the liquid crystal molecules to be as large as 180° to 270°.

In the liquid crystal display device using such an STN liquid crystal cell, one of a pair of polarizing plates respectively arranged on the incidence side and emergence side of the liquid crystal cell is arranged such that the direction of its polarization axis (axis of transmission or absorption) has a certain deviation angle (35° to 50°) with respect to the direction of liquid crystal alignment on the surface of a liquid crystal cell substrate opposed to the polarizing plate. With this arrangement, linearly polarized light incident through the polarizing plate on the incidence side is converted into an elliptically polarized light by the birefringence characteristic of the liquid crystal layer of the liquid crystal cell, and the transmission of light is controlled by the polarizing plate on the emergence side, thereby displaying a corresponding image. Since the refractive index anisotropy of the liquid crystal layer varies with light wavelength, the transmittance of light in a specific wavelength range is increased, resulting in coloring in display.

For this reason, in a liquid crystal display device using the above-described STN liquid crystal cell, in order to prevent coloring in display, an STN compensation liquid crystal cell in which liquid crystal molecules are aligned to be twisted in a direction opposite to the liquid crystal twist direction of the display liquid crystal cell having display electrodes is arranged between the STN display liquid crystal cell and one of a pair of polarizing plates respectively arranged on the incidence and emergence sides of the display liquid crystal cell.

In this liquid crystal display device, retardation on the liquid crystal layer of the display liquid crystal cell and retardation on the liquid crystal layer of the compensation liquid crystal cell are caused to cancel each other. More specifically, the liquid crystal molecules of the display and compensation liquid crystal cells are respectively aligned to be twisted through the same angle in the opposite directions, and the liquid crystal alignment directions of the display and compensation liquid crystal cells are set to be perpendicular to each other on the respective adjacent substrate surfaces. With this arrangement, in an initial state wherein no voltage is applied across opposing electrodes of the display liquid crystal cell, light transmitted through the display liquid crystal cell and the compensation liquid crystal cell substantially becomes linearly polarized light and is incident on the emergence side polarizing plate, thus preventing leakage of light in a specific wavelength range and coloring in display.

In a known conventional liquid crystal display device of this type, the same liquid crystal is used for a display liquid crystal cell and a compensation liquid crystal cell, and the liquid crystal layer thicknesses (cell gaps) d of the two cells are set to be equal to each other so that the values of $\Delta n \cdot d$ (the product of refractive index anisotropy $\Delta n$ of a liquid crystal and the liquid crystal layer thickness d) of the two cells coincide with each other. As the liquid crystal sealed in the two cells, a liquid crystal having a refractive index $\Delta n$ of 0.6 to 0.7 is used to increase the range of angles from the normal direction in which an image formed by the liquid crystal cell can be clearly seen (to be referred to as a viewing angle characteristic hereinafter). In addition, the value of $\Delta n \cdot d$ of each cell is set to be 0.14 or less.

Although the conventional liquid crystal display device has a good viewing angle characteristic and high contrast in display, the response time (the operation time of the liquid crystal of the display liquid crystal cell) to a driving voltage is as long as about 150 msec. That is, the conventional device has a low response speed. Therefore, if a motion image such as a television image is displayed, the displayed image is seen as if it is flowing.

SUMMARY OF THE INVENTION

The present invention has been made in consideration of the above-described drawback, and has as its object to provide an STN liquid crystal display device which has high contrast in the normal direction of a liquid crystal cell and high response speed, and can properly display a motion image such as a television image.

It is another object of the present invention to provide a display apparatus which can enlarge a motion image such as a television image and display it.

In order to achieve the above objects, according to the present invention, there is provided a liquid crystal display device comprising:

first and second substrates arranged to oppose each other through a predetermined gap so that electrodes are respectively formed on opposing surfaces of the first and second substrates to be substantially perpendicular to each other and oppose each other, and alignment films subjected to alignment processing are formed to cover the electrodes so as to align liquid crystal molecules in a predetermined direction;

a first liquid crystal material sealed between the first and second substrates by a seal member to be twisted within a range of 180° to 270° in a first twist direction, the first liquid crystal material having a refractive index anisotropy $\Delta n_1$ of the first liquid crystal material which is not less than 0.18 and a product $\Delta n_1 \cdot d_1$ of the refractive index anisotropy $\Delta n_1$ and a layer thickness $d_1$ of the material which is not less than 0.7 μm;

third and fourth substrates arranged near the second substrate to oppose each other through a predetermined gap so that alignment films for aligning liquid crystal molecules in a predetermined direction are respectively formed on opposing surfaces of the third and fourth substrates, and one of the alignment films which is adjacent to the second substrate is subjected to alignment processing in a direction substantially perpendicular to the alignment processing direction of the alignment film of the second substrate;

a second liquid crystal material sealed between the third and fourth substrates to be twisted in a second twist direction opposite to the first twist direction at substantially the same twist angle as that of the first liquid crystal material, the second liquid crystal material having a product $\Delta n_2 \cdot d_2$ of a refractive index anisotropy $\Delta n_2$ and a layer thickness $d_2$ of the second liquid crystal material which is smaller than the product $\Delta n_1 \cdot d_1$ of the first liquid crystal material; and first and second polarizing plates arranged at positions to sandwich the first to fourth substrates such that polarization axes of the first and second polarizing plates are substantially perpendicular to each other.

According to the present invention having the above-described arrangement, since the refractive index anisotropy $\Delta n_1$ of the first liquid crystal material is as large as 0.18 or more and the product $\Delta n_1 \cdot d_1$ is as large as 0.7 μm or more, the transmittance of the liquid crystal cell is increased, and the contrast in the normal direction of the liquid crystal display device is high. In addition, since the refractive index anisotropy $\Delta n_1$ is as large as 0.18 or more, only a small value $d_1$ is required to obtain a desired value $\Delta n_1 \cdot d_1$, and the liquid crystal layer thickness can be reduced. Therefore, the strength of an electric field applied to the liquid crystal is increased, and the response speed of the liquid crystal cell is increased.

In addition, since the product $\Delta n_2 \cdot d_2$ of the second liquid crystal material is smaller than the product $\Delta n_1 \cdot d_1$ of the first liquid crystal material, the transmittance of the liquid crystal display device is minimized when a bias voltage is applied between the electrodes sandwiching the first liquid crystal material. Furthermore, since the alignment state of the first liquid crystal material is changed when a signal voltage is applied in addition to the bias voltage, the liquid crystal display device of the present invention can be substantially operated at a high voltage. Therefore, the response speed is increased.

In addition, according to the present invention, there is provided a display apparatus comprising:

a light source for emitting a light;

a display liquid crystal cell arranged in an optical path of light emitted from the light source, having first and second substrates arranged to oppose each other through a predetermined gap so that electrodes are respectively formed on opposing surfaces of the first and second substrates to be substantially perpendicular to each other and oppose each other and alignment films subjected to alignment processing are formed to cover the electrodes so as to align liquid crystal molecules in a predetermined direction, and a first liquid crystal material sealed between the first and second substrates by a seal member to be twisted within a range of 180° to 270° in a first twist direction, the first liquid crystal material having a refractive index anisotropy $\Delta n_1$ of the first liquid crystal material which is not less than 0.18 and a product $\Delta n_1 \cdot d_1$ of the refractive index anisotropy $\Delta n_1$ and a layer thickness $d_1$ of the material which is not less than 0.7 μm, for supplying a predetermined signal between the opposing electrodes to form a desired image;

a compensation liquid crystal cell arranged in the optical path of the light emitted from the light source, for optically compensating for the light transmitted through the display liquid crystal cell, the compensation liquid crystal cell having third and fourth substrates arranged to oppose each other through a predetermined gap so that alignment films for aligning liquid crystal molecules in a predetermined direction are respectively formed on opposing surfaces of the third and fourth substrates and one of the alignment films which is adjacent to one of the first and second substrates is subjected to alignment processing in a direction substantially perpendicular to the alignment processing direction of the alignment film of the adjacent substrate, and a second liquid crystal material sealed between the third and fourth substrates to be twisted in a second twist direction opposite to the first twist direction at substantially the same twist angle as that of the first liquid crystal material, the second liquid crystal material having a product $\Delta n_2 \cdot d_2$ of a refractive index anisotropy $\Delta n_2$ and a layer thickness $d_2$ of the second liquid crystal material which is smaller than the product $\Delta n_1 \cdot d_1$ of the first liquid crystal material;

first and second polarizing plates arranged at positions to sandwich the first to fourth substrates such that polarization axes of the first and second polarizing plates are substantially perpendicular to each other; and optical means for enlarging the image formed by the display liquid crystal cell.

According to the present invention having the above-described arrangement, since the front surface contrast of a liquid crystal device constituted by the display cell and the compensation cell is high, an image formed by the liquid crystal device can be enlarged by the optical means, and the enlarged image can be clearly displayed. Furthermore, since the liquid crystal device of the present invention has high response speed, it can display a motion image such as a television image.

When the above-described liquid crystal device is applied to a display apparatus, the display cell and the compensation cell are preferably separated from each other by a distance larger than a range allowing an imaging operation of the optical means. With this arrangement, the images of spaces distributed in the compensation cell for uniforming the thickness of the liquid crystal are not enlarged and displayed by the optical means. Therefore, no undesired display is performed, and a display apparatus with high display quality can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be described in detail below with reference to the accompanying drawings.

[First Embodiment]

Figure 1:
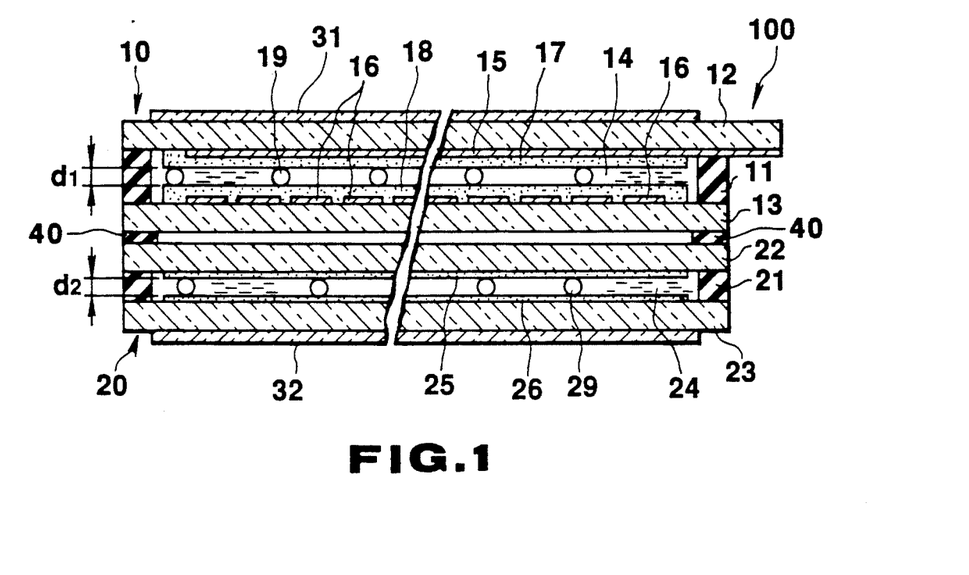
FIG. 1 is a sectional view showing the first embodiment of the present invention.

The first embodiment of the present invention will be described below with reference to FIGS. 1 to 6. FIG. 1 is a sectional view showing a liquid crystal device according to the first embodiment. In this liquid crystal device, polarizing plates 31 and 32 are respectively arranged on the incidence and emergence sides of an STN display liquid crystal cell (to be referred to as a display cell hereinafter) 10, and an STN compensation liquid crystal cell (to be referred to as a compensation cell hereinafter) 20 is arranged between the display cell 10 and one of the polarizing plates 31 and 32 (in this embodiment, the emergence side polarizing plate 32 at the lower position in FIG. 1). In the compensation cell 20, liquid crystal molecules are aligned to be twisted in a direction opposite to the twist direction of the liquid crystal molecules of the display cell 10. The incidence side polarizing plate 31 is bonded to the incidence surface of the display cell 10 (the upper surface of an incidence side substrate 12). The emergence side polarizing plate 32 is bonded to the emergence surface of the compensation cell 20 (the lower surface of an emergence side substrate 23). Note that the display cell 10 and the compensation cell 20 are supported by a support member 40 in such a manner that the emergence surface of the display cell 10 and the incidence surface of the compensation cell 20 oppose each other.

Transparent substrates 12 and 13 of the display cell 10 are bonded to each other through a frame-like seal member 11 while cell gap regulating spacers 19 are distributed between the substrates 12 and 13. A liquid crystal 14 is sealed between the pair of transparent substrates 12 and 13, and transparent display electrodes 15 and 16 are formed between the opposing surfaces of the substrates 12 and 13. Alignment films 17 and 18 are respectively formed on the substrate surfaces on which the electrodes are respectively formed. The molecules of the liquid crystal 14 are aligned between the two substrates 12 and 13 to be twisted at a twist angle of 180° to 270°.

The display cell 10 is of a simple matrix type. The display electrodes 15 on the surface of one substrate 11 are stripe-like scanning electrodes, whereas the display electrodes 16 on the surface of the other substrate 12 are stripe-like signal electrodes perpendicular to the scanning electrodes 15. The display cell 10 shown in FIG. 1 is designed to display a monochromatic image. A display cell for displaying a full-color image, however, has red, green, and blue color filters arranged on one of the substrate surfaces in correspondence with each electrode.

The compensation cell 20 is designed such that the transparent substrates 22 and 23 are bonded to each other through the frame-like seal member 21 while the spacers 29 are distributed between the substrates 22 and 23, and a liquid crystal 24 is sealed between the transparent substrates 22 and 23. On the opposing surfaces of the substrates 22 and 23, display electrodes and the like are not formed, but only alignment films 25 and 26 are formed. The molecules of the liquid crystal 24 of the compensation cell 20 are aligned between the substrates 22 and 23 to be twisted at the same twist angle as that of the liquid crystal molecules of the display cell 10 in a twist direction opposite to that of the liquid crystal molecules of the display cell 10.

Note that the alignment directions of liquid crystal molecules (the alignment treatment directions of the alignment films 18 and 25) adjacent to the surfaces, of the substrates 13 and 22, which respectively oppose the display cell 10 and the compensation cell 20 are substantially perpendicular to each other, and the polarization axes (axes of transmission or absorption) of the incidence and emergence side polarizing plates 31 and 32 are substantially perpendicular to each other.

A product $\Delta n_2 \cdot d_2$ of a refractive index anisotropy $\Delta n_2$ of the liquid crystal 24 of the compensation cell 20 and a liquid crystal layer thickness (cell gap) $d_2$ is set to be smaller than a product $\Delta n_1 \cdot d_1$ of a refractive index anisotropy $\Delta n_1$ of the liquid crystal 14 of the display cell 10 and a liquid crystal layer thickness (cell gap) $d_1$. The value $\Delta n_1 \cdot d_1$ of the display cell 10 is larger than 0.7. The refractive index anisotropy $\Delta n_1$ of the liquid crystal 14 of the display cell 10 is 0.18 or more. Note that in this embodiment, the same liquid crystal is used for the liquid crystal 24 of the compensation cell 20 and the liquid crystal 14 of the display cell 14, and the liquid crystal layer thickness $d_2$ of the compensation cell 20 is set to be smaller than the liquid crystal layer thickness $d_1$ of the display cell 10 so that the value $\Delta n_2 \cdot d_2$ of the compensation cell 20 is smaller than the value $\Delta n_1 \cdot d_1$ of the display cell 10.

In this liquid crystal device 100, the value $\Delta n_2 \cdot d_2$ of the compensation cell 20 is set to be smaller than the value $\Delta n_1 \cdot d_1$ of the display cell 10. Therefore, in an initial state wherein no voltage is applied across the display electrodes 15 and 16 of the display cell 10, the transmittance of light incident on the emergence side polarizing plate 32 through the two cells 10 and 20 does not become "0". However, when a bias voltage is applied across the electrodes 15 and 16 of the display cell 10, the value $\Delta n_1 \cdot d_1$ of the display cell is reduced because of an electric field between the electrodes 15 and 16, and becomes substantially equal to the value $\Delta n_2 \cdot d_2$ of the compensation cell 20. At this time, the transmittance becomes substantially "0". If the voltage for the above-mentioned electric field is increased, the alignment state of the liquid crystal molecules of the display cell 10 becomes closer to vertical alignment, and the value $\Delta n_1 \cdot d_1$ is further reduced, thus increasing the transmittance.

Figure 2:
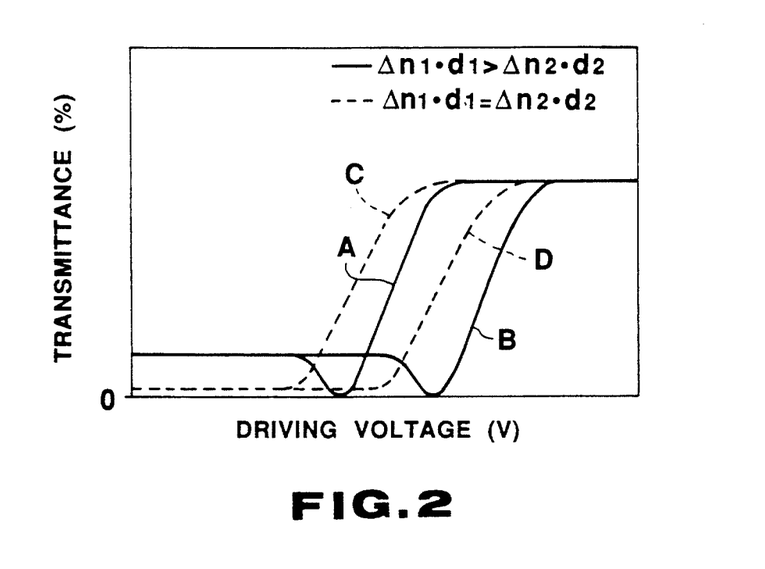
FIG. 2 is a graph of transmittance characteristics indicating changes in transmittance with respect to a selection waveform voltage and a non-selection waveform voltage applied across the electrodes of a display cell.

FIG. 2 shows changes in transmittance of light with respect to a selection waveform voltage and a non-selection waveform voltage applied across the electrodes 15 and 16 of the display cell 10 in the multiplexing drive mode. Referring to FIG. 2, broken lines represent changes in transmission of light in a case wherein the value $\Delta n_1 \cdot d_1$ of the display cell 10 is equal to the value $\Delta n_2 \cdot d_2$ of the compensation cell 20; and solid lines, changes in transmittance in a case wherein the value $\Delta n_2 \cdot d_2$ of the compensation cell 20 is set to be smaller than the value $\Delta n_1 \cdot d_1$ of the display cell 10. In this graph, a solid line A and a broken line C represent changes in transmittance with respect to the selection waveform voltage, whereas a solid line B and a broken line D represent changes in the non-selection waveform voltage.

As is apparent from FIG. 2, when the value $\Delta n_1 \cdot d_1$ of the display cell and the value $\Delta n_2 \cdot d_2$ of the compensation cell are equal to each other, the transmission is kept to be substantially "0" until the voltage between the electrodes of the display cell reaches a predetermined value, and the transmittance starts to increase when the voltage exceeds the predetermined value. When the value $\Delta n_2 \cdot d_2$ of the compensation cell is smaller than the value $\Delta n_1 \cdot d_1$ of the display cell, leakage of light occurs until the voltage between the electrodes of the display cell reaches a predetermined value, but the transmittance becomes substantially "0" at the predetermined voltage. In this case, when the voltage exceeds the predetermined value, the transmittance is abruptly increased. That is, in the liquid crystal device in which the value $\Delta n_2 \cdot d_2$ of the compensation cell is smaller than the value $\Delta n_1 \cdot d_1$ of the display cell, changes in transmittance with respect to an applied voltage are more rapid than those in the liquid crystal device in which the value $\Delta n_1 \cdot d_1$ of the display cell and the value $\Delta n_2 \cdot d_2$ of the compensation cell are equal to each other.

For this reason, the liquid crystal device 100 is driven in the following manner. In an OFF period in which transmission of light is inhibited, a voltage for substantially equalizing the value $\Delta n_1 \cdot d_1$ of the display cell 10 and the value $\Delta n_2 \cdot d_2$ of the compensation cell 20 is applied, as a bias voltage in the multiplexing drive mode, between the electrodes 15 and 16 of the display cell 10. In contrast to this, in an ON period in which light is transmitted, a voltage sufficiently higher than the bias voltage is applied across the electrodes 15 and 16 of the display cell 10.

Figure 4:
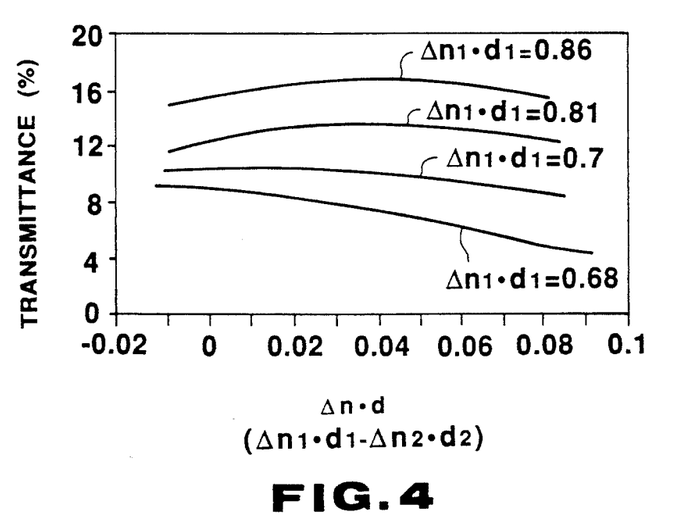
FIG. 4 is a graph showing the differences in transmittance of liquid crystal devices having different values of $\Delta n_1 \cdot d_1$ in relation to the difference between $\Delta n_1 \cdot d_1$ of the display cell and $\Delta n_2 \cdot d_2$ of the compensation cell.

According to the liquid crystal device 100, as shown in FIG. 4, since the refractive index anisotropy $\Delta n_1$ of the liquid crystal material for the display cell 10 is as large as 0.18 or more, and the product $\Delta n_1 \cdot d_1$ is as large as 0.7 μm or more, the transmittance of the liquid crystal cell becomes large. Hence, the contrast of the liquid crystal device in the normal direction (front contrast) is very high.

Figure 3:
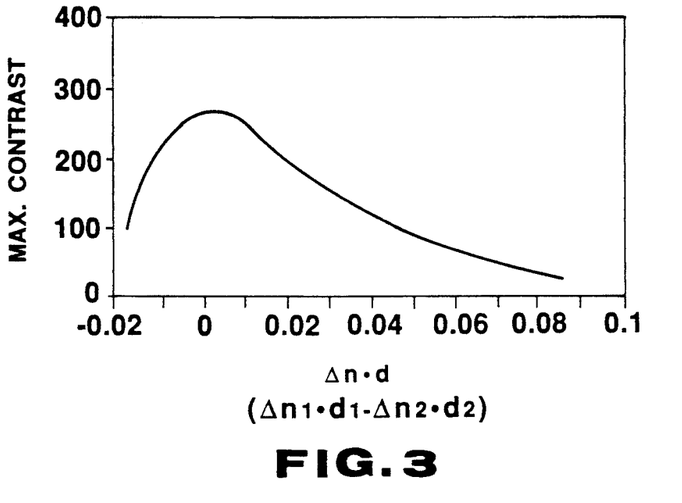
FIG. 3 is a graph showing the relationship between the difference between $\Delta n_1 \cdot d_1$ of the display cell and $\Delta n_2 \cdot d_2$ of a compensation cell and the contrast of the liquid crystal device.

In addition, according to the liquid crystal device 100, as shown in FIG. 3, since the value $\Delta n_2 \cdot d_2$ of the compensation cell 20 is set to be smaller than the value $\Delta n_1 \cdot d_1$ of the display cell 10, the maximum contrast is lower than that obtained when the $\Delta n_1 \cdot d_1$ of the display cell 10 and the $\Delta n_2 \cdot d_2$ of the compensation cell 20 are equal to each other. FIG. 3 shows the relationship between the maximum contrast and a difference $\Delta n \cdot d$ ($\Delta n_1 \cdot d_1 - \Delta n_2 \cdot d_2$) between the display cell 10 and the compensation cell 20. According to FIG. 3, the maximum contrast reaches the highest level when the difference $\Delta n \cdot d$ between the cells 10 and 20 is 0, and is decreased with an increase in the difference $\Delta n \cdot d$ between the cells 10 and 20.

As shown in FIG. 4, in the liquid crystal device, the transmittance in an ON voltage application period is increased with an increase in the value $\Delta n_1 \cdot d_1$ of the display cell 10, even though the maximum contrast cannot be obtained, the display contrast in the display drive mode is high as long as the $\Delta n_1 \cdot d_1$ of the display cell 10 is large.

FIG. 4 shows the result obtained by checking the relationship between the difference $\Delta n \cdot d$ between the cells 10 and 20 and the transmittance in an ON voltage application period in various types of liquid crystal devices having different values $\Delta n_1 \cdot d_1$. As shown in FIG. 4, the value $\Delta n_1 \cdot d_1$ of the display cell 10, with which sufficiently high contrast (a contrast value of about 10 or more) even if the difference $\Delta n \cdot d$ between the cells 10 and 20 is large, is 0.7 or more. For this reason, the value $\Delta n_1 \cdot d_1$ of the display cell 10 of the liquid crystal device of this embodiment is set to be 0.7 or more.

FIG. 4 shows measurement values obtained when a liquid crystal having a refractive index anisotropy $\Delta n$ of 0.18 is used as the liquid crystals 14 and 24 of the display cell 10 and the compensation cell 20. In this case, the liquid crystal layer thickness $d_1$ of the display cell 10 is set as follows: $d_1 = 3.7$ μm for a cell having $\Delta n_1 \cdot d_1 = 0.68$; $d_1 = 3.9$ μm for a cell having $\Delta n_1 \cdot d_1 = 0.7$; $d_1 = 4.4$ μm for a cell having $\Delta n_1 \cdot d_1 = 0.81$; and $d_1 = 4.7$ μm for a cell having $\Delta n_1 \cdot d_1 = 0.86$.

Figure 5:
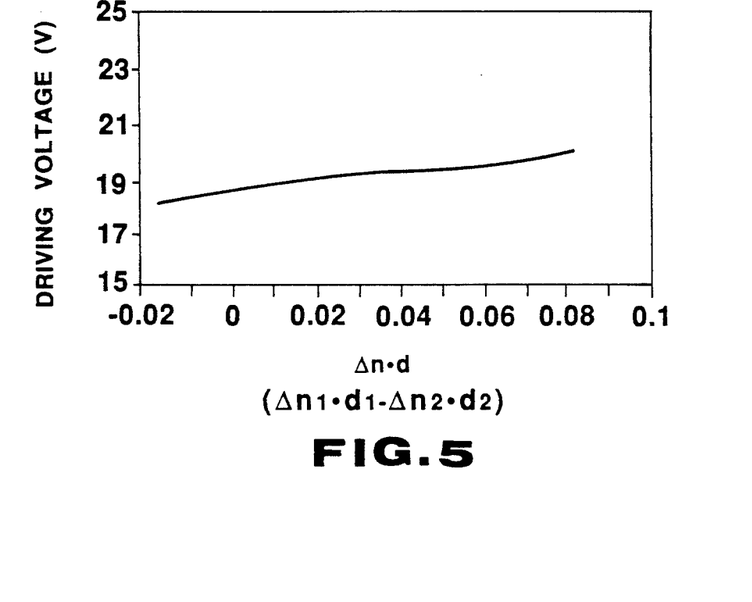
FIG. 5 is a graph showing the relationship between the difference between $\Delta n_1 \cdot d_1$ of the display cell and $\Delta n_2 \cdot d_2$ of the compensation cell and a driving voltage at which the maximum contrast of the liquid crystal device can be obtained.

Since the liquid crystal device is driven by applying a non-selection waveform bias voltage and a selection waveform ON voltage between the electrodes 15 and 16 of the display cell 10, the driving voltage of the display cell 10 is high, as shown in FIG. 5. FIG. 5 shows the relationship between the difference $\Delta n \cdot d$ between the display cell 10 and the compensation cell 20 and the driving voltage at which the maximum contrast can be obtained. As shown in FIG. 5, the driving voltage at which the maximum contrast can be obtained is increased with an increase in the difference $\Delta n \cdot d$ between the two cells 10 and 20.

In the above-described liquid crystal device, since a liquid crystal whose refractive index anisotropy $\Delta n_1$ is 0.18 or more is used for the display cell 10, even if the value $\Delta n_1 \cdot d_1$ of the display cell 10 is set to be 0.7 or more, the liquid crystal layer thickness $d_1$ of the display cell 10 can be set to be small. Since this liquid crystal layer thickness $d_1$ can be small, the intensity of the electric field between the electrodes 15 and 16 of the display cell 10 is increased. As described above, since the driving voltage of the display cell 10 is high and the liquid crystal layer thickness $d_1$ of the display cell 10 is small, the intensity of the electric field between the electrodes 15 and 16 of the display cell 10 is increased. This strong electric field acts on the liquid crystal 14 of the display cell 10 to increase the response speed of the display cell 10.

Figure 6:
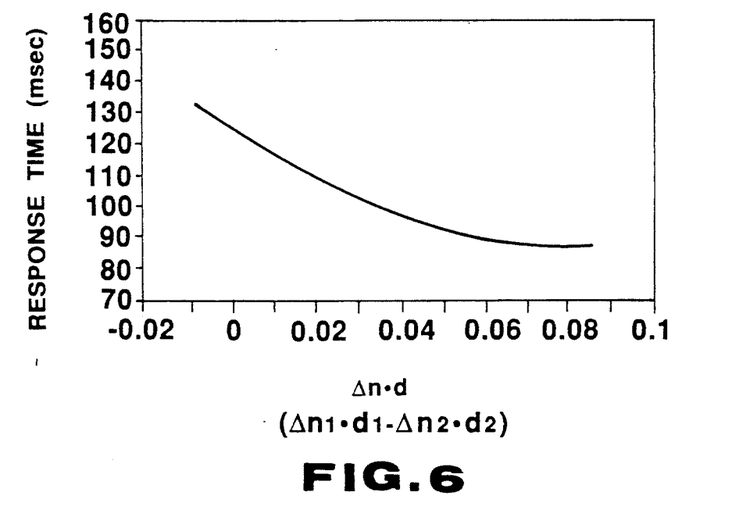
FIG. 6 is a graph showing the relationship between the difference between $\Delta n_1 \cdot d_1$ of the display cell and $\Delta n_2 \cdot d_2$ of the compensation cell and the response time of the liquid crystal device.

FIG. 6 shows the relationship between the difference $\Delta n \cdot d$ between the two cells 10 and 20 and the response time (the operation time of the liquid crystal 14 with respect to an applied driving voltage) of the display cell 10.

As shown in FIG. 6, the response time of the display cell 10 is about 110 msec when the difference $\Delta n \cdot d$ between the two cells 10 and 20 is 0.02, and is about 103 msec when the difference $\Delta n \cdot d$ is 0.03. That is, the response time of the display cell 10 is much shorter than that (about 150 msec) of the display cell of the conventional liquid crystal device.

According to the liquid crystal display device, therefore, since the contrast is high and the response speed is high, a motion image such as a television image can be displayed in a good display state.

In the above-described embodiment, the value of $\Delta n_1 \cdot d_1$ of the display cell 10 is required to be 0.7 or more, and the refractive index anisotropy $\Delta n_1$ of the liquid crystal 14 of the display cell 10 is required to be 0.18 or more. Therefore, when the respective characteristics shown in FIGS. 3 to 6 are estimated as a whole, the refractive index anisotropy $\Delta n_1$ of the liquid crystal 14 of the display cell 10 is preferably set to be 0.184; the value of $\Delta n_1 \cdot d_1$ of the display cell 10, 0.74; and the difference between the value $\Delta n_1 \cdot d_1$ of the display cell 10 and the value $\Delta n_2 \cdot d_2$ of the compensation cell 20, 0.02.

In the above embodiment, the compensation cell 20 is arranged on the emergence side of the display cell 10. However, the compensation cell 20 may be arranged on the incidence side of the display cell 10. In addition, the liquid crystal 24 of the compensation cell 20 may differ in type from the liquid crystal 14 of the display cell 10. In this case, the liquid crystal layer thickness $d_2$ of the compensation cell 20 is to be selected in accordance with the refractive index anisotropy $\Delta n_2$ of the liquid crystal 24 of the compensation cell 20 so as to set the value $\Delta n_2 \cdot d_2$ of the compensation cell 20 to be smaller than the value $\Delta n_1 \cdot d_1$ of the display cell 10.

[Second Embodiment]

The second embodiment of the present invention will be described in detail below with reference to FIG. 7. In the second embodiment, the liquid crystal device of the first embodiment is applied to the viewfinder of a camera for taking a television image.

Figure 7:
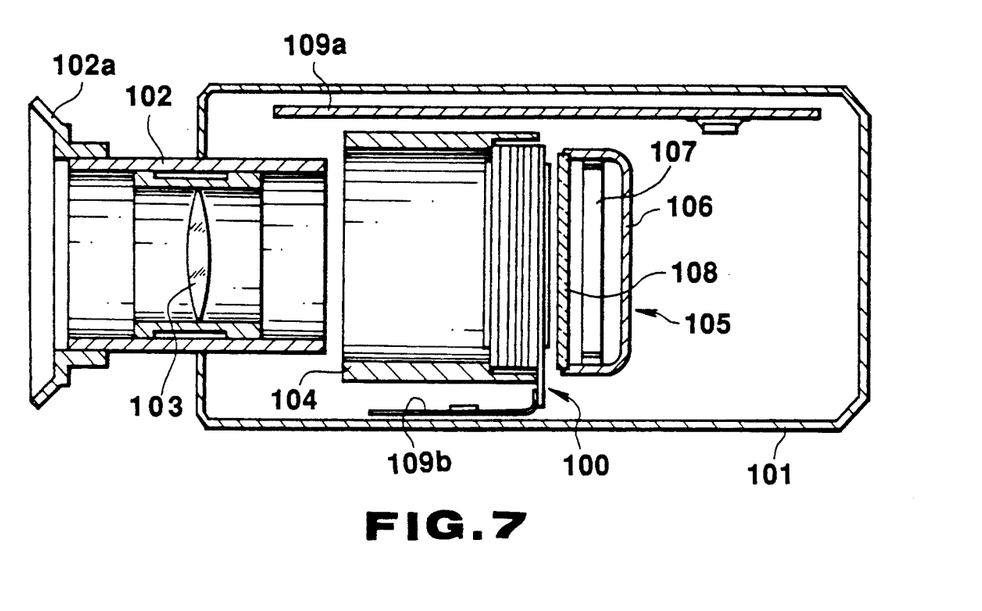
FIG. 7 is a sectional view showing the second embodiment in which the liquid crystal device of the first embodiment is applied to a viewfinder.

Referring to FIG. 7, a barrel 102 is arranged at one end of a viewfinder body 101. An eyepiece portion 102a is mounted on the outer end of the barrel 102 while a lens 103 for enlarging a display image is arranged in the barrel 102. In addition, a rectangular parallel-piped cell support case 104 is arranged in the viewfinder body 101. The liquid crystal device of the first embodiment described above is mounted on the rear end portion of the cell support case 104.

A backlight 105 for illuminating the liquid crystal device from its rear surface is arranged behind the cell support case 104. The backlight 105 comprises a reflector 106 having an opening area slightly larger than the display region of the liquid crystal device, a plurality of fluorescent lamps 107 arranged in the reflector 106, and a light diffusion plate 108 arranged at the opening surface of the reflector 107.

The following circuits are mounted on a main circuit board 109a: a circuit for processing image data from the video camera, a display driving control circuit, a backlight driving circuit, and the like. The main circuit board 109a is arranged along the viewfinder body 101. On a display driving circuit board 109b, a driving circuit for a display cell 100 is mounted. The board 109b is also arranged along the viewfinder body 101. The display driving circuit board 109b and the backlight 105 are connected to the main circuit board 109a through connection cables (not shown). The display driving circuit board 109b is constituted by a flexible board. One end portion of the board 109b is connected to the display cell 10 of the liquid crystal device.

The liquid crystal viewfinder of this embodiment is designed to radiate light from the backlight 105 onto the liquid crystal device and enlarge an image formed by the liquid crystal device so as to allow observation of the enlarge image from the eyepiece portion 102a through the lens 103.

According to this liquid crystal viewfinder, as described in the first embodiment, in the liquid crystal device 100, the refractive index anisotropy $\Delta n_1$ of the liquid crystal material for the display cell is as large as 0.18 or more, and the product $\Delta n_1 \cdot d_1$ is also as large as 0.7 $\mu$m. Therefore, the front surface contrast of the liquid crystal device is very high. Since this liquid crystal viewfinder is designed to allow observation only from the front surface, an image formed by the liquid crystal device can be clearly observed as an image with very high contrast, even though the device has the conventional drawback of a narrow viewing angle.

In addition, since the liquid crystal device 100 of the liquid crystal viewfinder has high response speed, a motion image such as a television image can be clearly displayed.

The liquid crystal display apparatus of the present invention is not limited to the liquid crystal viewfinder shown in FIG. 2. For example, the present invention can be applied to a projection apparatus such as a liquid crystal projector.

[Third Embodiment]

The third embodiment of the present invention will be described in detail below with reference to FIGS. 8 to 10. Similar to the second embodiment, in the third embodiment, the liquid crystal device of the first embodiment described above is applied to the viewfinder of a camera for taking a television image. In this embodiment, spacers are inserted between the substrates of liquid crystal cells so as not to be conspicuous. The same reference numerals in the third embodiment denote the same parts as in the first and second embodiments, and a description thereof will be omitted.

Figure 8:
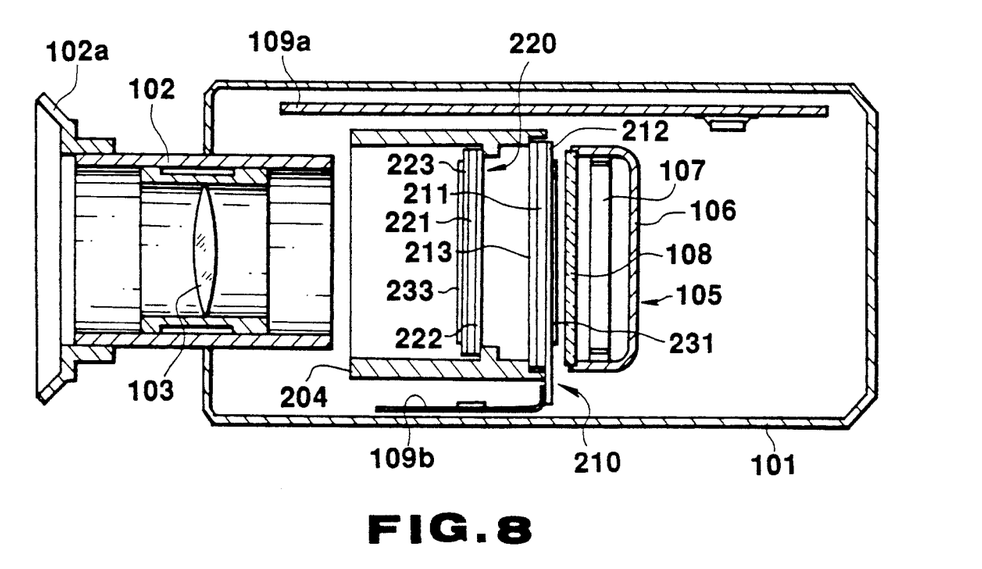
FIG. 8 is a sectional view showing the third embodiment in which the liquid crystal device of the first embodiment is applied to a viewfinder.

Referring to FIG. 8, a rectangular parallel-piped cell support case 204 is arranged such that its axis is aligned with the axis of a barrel 102 (the axis of a lens 103). A backlight 105 is arranged behind the cell support case 204. An STN display cell 210 and an STN compensation cell 220 are mounted in the cell support case 204. The display cell 210 is arranged on the side on which light from the backlight 105 is incident, whereas the compensation cell 220 is arranged on the light emergence side of the display cell 210.

The structures of the display cell 210 and the compensation cell 220 will be described below.

Figure 9:
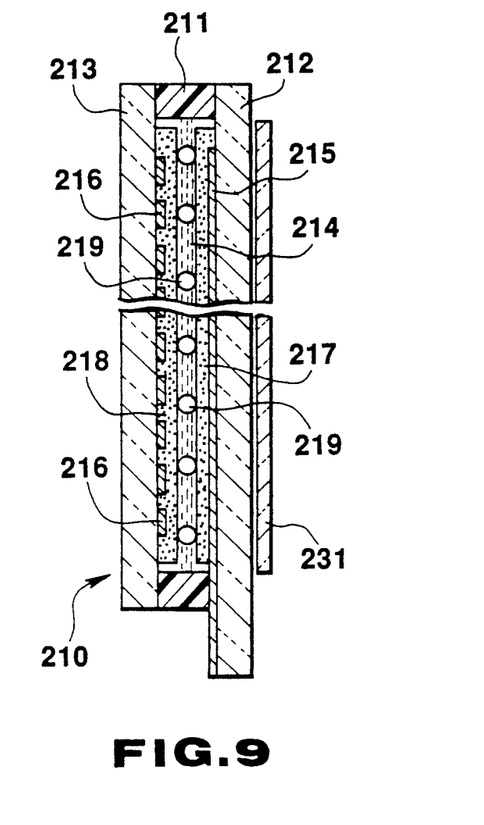
FIG. 9 is an enlarged sectional view showing a display cell used for the third embodiment shown in FIG. 8.

FIG. 9 is a sectional view of the display cell 210. The display cell 210 is designed such that a liquid crystal 214 is sealed between a pair of transparent substrates 212 and 213 bonded to each other through a frame-like seal member 211. Display electrodes 215 and 226 are respectively formed on the opposing surfaces of the substrates 212 and 213. Alignment films 217 and 218 are respectively formed on the surface on which the electrodes 215 and 226 are formed. The molecules of the liquid crystal 214 are aligned between the two substrates 212 and 213 to be twisted at a twist angle of 180° to 270°. Similar to the liquid crystal in the first embodiment, the liquid crystal 214 has a large refractive index anisotropy $\Delta n_1$ of 0.18 or more and a product $\Delta n_1 \cdot d_1$ of 0.7 µm or more.

The display cell 210 shown in FIG. 9 is of a simple matrix type, in which the display electrodes 215 formed on the surface of one substrate 212 are stripe-like scanning electrodes, and the display electrodes 216 formed on the surface of the other substrate 213 are stripe-like signal electrodes crossing the scanning electrodes 215 at a right angle. Spacers 219 are distributed between the two substrates 212 and 213. These spacers 219 are transparent cell gap regulating spacers (e.g., cut glass fiber members, glass particles, or plastic particles). The cell gap between the two substrates 212 and 213 is uniformly regulated by the spacers 219.

Figure 10:
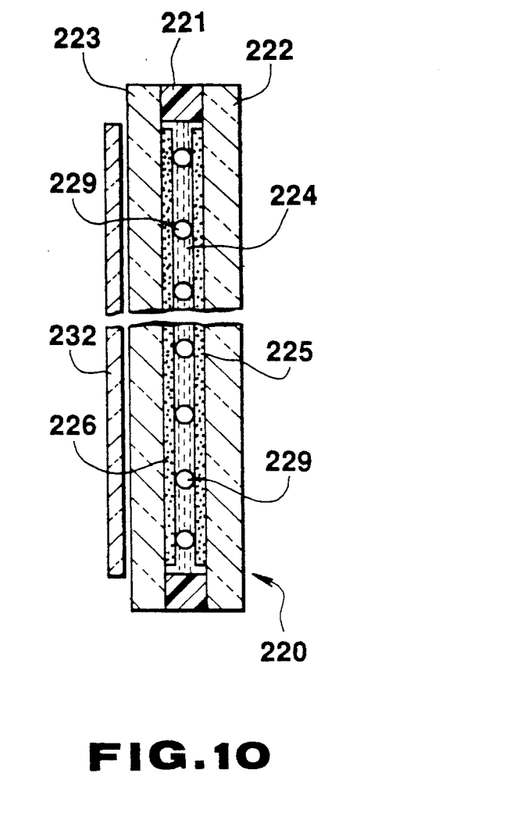
FIG. 10 is an enlarged sectional view showing a compensation cell used for the third embodiment shown in FIG. 8.

FIG. 10 is a sectional view of the compensation cell 220. The compensation cell 220 is formed by sealing a liquid crystal 224 between a pair of transparent substrates 222 and 223 bonded to each other through a frame-like seal member 221. Display electrodes and the like are not formed on the opposing surfaces of the two substrates 222 and 223, but only alignment films 225 and 226 are respectively formed thereon. The molecules of the liquid crystal 224 of the compensation cell 220 are aligned between the two substrates 222 and 223 to be twisted at the same twist angle as that of the liquid crystal molecules of the display cell 210 in a direction opposite to the twist direction of the liquid crystal molecules of the display cell 210. Transparent cell gap regulating spacers 229 are also distributed between the two substrates 222 and 223. The cell gap between the two substrates 222 and 223 is uniformly regulated by the spacers 290.

As shown in FIG. 8, the display cell 210 is mounted on the rear end of the cell support case 204 while the light emergence surface of the cell opposes the lens 103. The compensation cell 220 is mounted in the cell support case 204 to be separated from the display cell 210. In addition, the focus of the lens 103 in the barrel 102 is adjusted to the display cell 210 by moving the barrel 102 back and forth.

Note that the alignment directions of liquid crystal molecules (the alignment treatment directions of the alignment films 218 and 225) adjacent to the surfaces, of the substrates 213 and 222, which respectively oppose the display cell 210 and the compensation cell 220 are substantially perpendicular to each other. Reference numeral 231 denotes an incidence side polarizing plate; and 232, an emergence side polarizing plate. The incidence side polarizing plate 231 is bonded to the light incidence surface of the display cell 210, whereas the emergence side polarizing plate 232 is bonded to the light emergence surface of the compensation cell 220.

A product $\Delta n_2 \cdot d_2$ of a refractive index anisotropy $\Delta n_2$ of the liquid crystal 224 of the compensation cell 220 and a liquid crystal layer thickness $d_2$ is set to be smaller than a production $\Delta n_1 \cdot d_1$ of the display cell 210 by 0.02 to 0.03 µm in consideration of an increase in temperature of the display cell 210 due to heat generated by the backlight 105 and a bias voltage applied to the display cell 210. Such setting is performed for the following reason. In order to substantially prevent coloring in display in the display cell 210 by using the compensation cell 220, the values $\Delta n \cdot d$ of the two cells 210 and 220 must be set to be substantially equal to each other. However, the value $\Delta n \cdot d$ of a liquid crystal cell changes depending on temperatures and an electric field applied to a liquid crystal layer. More specifically, in this embodiment, since the backlight 105 is arranged behind the display cell 210, the temperature of the display cell 210 is increased by heat generated by the backlight 105, and the value $\Delta n_1 \cdot d_1$ is reduced. In contrast to this, since the temperature of the compensation cell 220 separated from the backlight 105 is only slightly increased, changes in $\Delta n_2 \cdot d_2$ of the compensation cell 220 are small. In addition, since a bias voltage for multiplexing drive is applied to the display cell 210 even in an OFF state, the value $\Delta n_1 \cdot d_1$ of the display cell 210 is reduced. However, no voltage is applied to the compensation cell 220, and hence no change in $\Delta n_2 \cdot d_2$ is caused by a voltage. Therefore, in order to substantially prevent coloring in display in the display cell 210 by using the compensation cell 220, the value $\Delta n_2 \cdot d_2$ of the compensation cell 220 is set to be smaller than the $\Delta n_1 \cdot d_1$ of the display cell 210 by about 10% in accordance with the difference in temperature between the two cells 210 and 220 and a bias voltage applied to the display cell 210. If the values $\Delta n \cdot d$ of the two cells 20 and 220 are set in this manner, these set values become substantially equal to each other when the $\Delta n_1 \cdot d_1$ of the display cell 210 is reduced by an increase in temperature and application of a bias voltage.

In the liquid crystal viewfinder of this embodiment, light emitted from the backlight 105 is incident on the display cell 210 through the incidence side polarizing plate 231, and the light transmitted through the display cell 210 is incident on the compensation cell 220. When the light emerging from the compensation cell 220 is detected by the emergence side polarizing plate 232, an image is displayed. With this operation, coloring in display, which is unique to an STN liquid crystal cell, can be prevented. The image formed by the liquid crystal device is enlarged by the lens 103 and observed through the eyepiece portion 102a.

In this liquid crystal viewfinder, the display cell 210 and the compensation cell 220 are arranged to be separated from each other, and the focus of the lens 103 is adjusted to the display cell 210 of the two cells 210 and 220. For this reason, of the images of the spacers 219 and 229 of the display and compensation cells 210 and 220 which are seen in the image enlarged by the lens 103 to be observed, the image of the spacers 229 becomes a defocus image. As a result, a display defect due to the image of the spacers 229 of the compensation cell 220 is substantially eliminated. Note that in this liquid crystal viewfinder, since the focus of the lens 103 is adjusted to the display cell 210, although an image observed through the eyepiece portion 102a is a clear in-focus image, the image of the spacers 219 of the display cell 210 is observed in the observed image. However, the number of spacer images are reduced to ½ that in the case wherein the images of the spacers 219 and 229 of the display and compensation cells 210 and 220 are observed in an observed image. Therefore, the quality of an observed image is greatly improved.

As described above, according to the above-described viewfinder, the STN compensation cell 220 is arranged on the light emergence side of the STN display cell 210, and a display image is enlarged by the lens 103 to be observed. In spite of such an arrangement, the image of the spacers 229 of the compensation cell 220 is substantially unnoticeable, thus improving the quality of an observed image.

In addition, according to the liquid crystal viewfinder of this embodiment, as described in the first embodiment, the refractive index anisotropy $\Delta n_1$ of the liquid crystal material for the display cell 210 is as large as 0.18 or more, and the product $\Delta n_1 \cdot d_1$ is also as large as 0.7 μm. Therefore, the front surface contrast of the liquid crystal cell is very high, and the contrast of a display image on the liquid crystal viewfinder is very high. Furthermore, in this liquid crystal viewfinder, since the response speed of each liquid crystal cell is high, a motion image such as television image can be clearly displayed.

In the above embodiment, the compensation cell 220 is arranged on the light emergence side of the display cell 210. However, this compensation cell 220 may be arranged on the light incidence side of the display cell 210. In this case, the focus of the lens 103 for enlarging a display image is also adjusted to the display cell 210. Therefore, the image of the spacers 229 of the compensation cell 220 is substantially unnoticeable.

In the above embodiment, a liquid crystal viewfinder mounted in a video camera is exemplified. However, the present invention can be applied to a liquid crystal display device such as a liquid crystal projector for enlarging a display image formed by a display cell using a magnification lens and projecting the enlarged image.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A display apparatus for enlarging an image formed by a liquid crystal device and for displaying the enlarged image, comprising:
   a light source for emitting a light;
   a display liquid crystal cell arranged in an optical path of light emitted from said light source, said display liquid crystal cell including:
   first and second substrates arranged to oppose each other through a predetermined gap;
   electrodes respectively formed on opposing surfaces of said first and second substrates, said electrodes being substantially perpendicular to each other and opposing each other;
   alignment films subjected to alignment processing formed to cover said electrodes so as to align liquid crystal molecules in a predetermined direction; and
   a first liquid crystal material sealed between said first and second substrates by a seal member, and being twisted within a range of 180° to 270° in a first twist direction, said first liquid crystal material having a refractive index anisotropy $\Delta n_1$ of said first liquid crystal material which is not less than 0.18 and a product $\Delta n_1 \cdot d_1$ of the refractive index anisotropy $\Delta n_1$ and a layer thickness $d_1$ of said material which is not less than 0.7 μm, and wherein a signal corresponding to image data on a desired motion image is supplied to a region between said opposing electrodes;
   a composition liquid crystal cell arranged in the optical path of the light emitted from said light source, for optically compensating for the light transmitted through said display liquid crystal cell, said compensation liquid crystal cell including:
   third and fourth substrates arranged to oppose each other through a predetermined gap;
   alignment films for aligning liquid crystal molecules in a predetermined direction respectively formed on opposing surfaces of said third and fourth substrates, and wherein one of said alignment films which is adjacent to one of said first and second substrates is subjected to alignment processing in a direction substantially perpendicular to the alignment processing direction of said alignment film of said adjacent substrate; and
   a second liquid crystal material sealed between said third and fourth substrates and being twisted in a second twist direction opposite to the first twist direction at substantially the same twist angle as that of said first liquid crystal material, said second liquid crystal material having a product $\Delta n_2 \cdot d_2$ of a refractive index anisotropy $\Delta n_2$ and a layer thickness $d_2$ of said second liquid crystal material which is smaller than the product $\Delta n_1 \cdot d_1$ of said first liquid crystal material;
   first and second polarizing plates arranged at positions to sandwich said first, second, third and fourth substrates such hat polarization axes of said first and second polarizing plates are substantially perpendicular to each other; and
   optical means for enlarging an image formed by said display liquid crystal cell; and
   means for holding said display liquid crystal cell and said compensation liquid crystal cell such that said display liquid crystal cell and said compensation liquid crystal cell are separated from each other by a distance larger than a depth of focus of said optical means.

2. A display apparatus according to claim 1, wherein:
   said optical means includes an optical system comprising at least one lens focused on said display liquid crystal cell; and
   said holding means comprises means for separating said display liquid crystal cell and said compensation liquid crystal cell from each other by a distance larger than a depth of focus of said optical system.

3. A display liquid crystal apparatus according to claim 1, wherein said compensation cell is arranged on an opposite side of said display cell to said light source.

* * * * *